United States Patent [19]

de Feo

[11] 3,997,768

[45] Dec. 14, 1976

[54] METHOD FOR PRODUCING SHEET MATERIAL OF A DESIRED WEIGHT PER UNIT AREA

[75] Inventor: Pio V. de Feo, Saratoga, Calif.

[73] Assignee: Measurex Corporation, Cupertino, Calif.

[22] Filed: Oct. 29, 1975

[21] Appl. No.: 626,649

[52] U.S. Cl. .................. 235/151.1; 235/151.3; 318/590; 235/151.33

[51] Int. Cl.² ........................ G05B 11/06

[58] Field of Search ....... 235/151.1, 151.3, 151.35, 235/151.33; 73/73; 72/7–10; 444/1; 318/590–597

[56] References Cited

UNITED STATES PATENTS

| | | | |
|---|---|---|---|
| 3,308,360 | 3/1967 | Vanderbilt | 318/591 X |
| 3,525,918 | 8/1970 | Parnell | 318/597 |
| 3,550,414 | 12/1970 | List | 72/8 |
| 3,592,031 | 7/1971 | Sutton et al. | 72/7 X |
| 3,626,165 | 12/1971 | McCall | 235/151.3 |
| 3,713,313 | 1/1973 | Spradlin | 235/151.1 X |
| 3,721,882 | 3/1973 | Helms | 318/603 X |
| 3,787,667 | 1/1974 | King et al. | 235/151.1 |
| 3,940,598 | 2/1976 | Sekiguchi | 235/151.1 |

*Primary Examiner*—Edward J. Wise
*Attorney, Agent, or Firm*—Flehr, Hohbach, Test, Albritton & Herbert

[57] ABSTRACT

A method for controlling the weight per unit area of a tire fabric and changing from one code to another uses the difference between the nominal calender roller gaps for the old and new codes to preset the gaps for the new code before feedback control is resumed.

1 Claim, 3 Drawing Figures

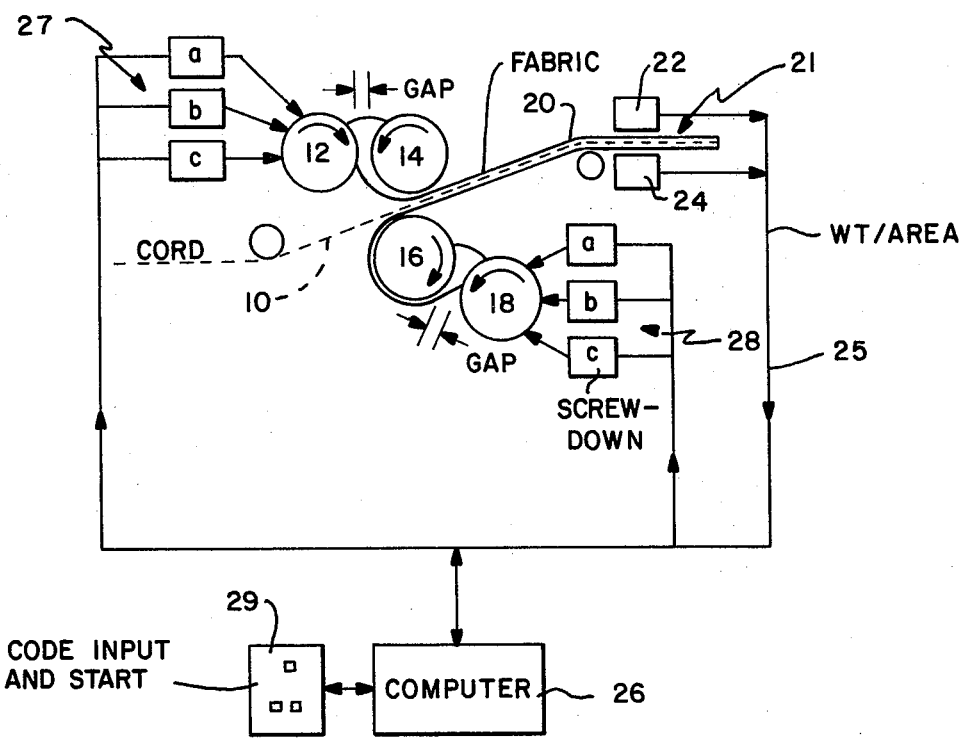
FIG.—1
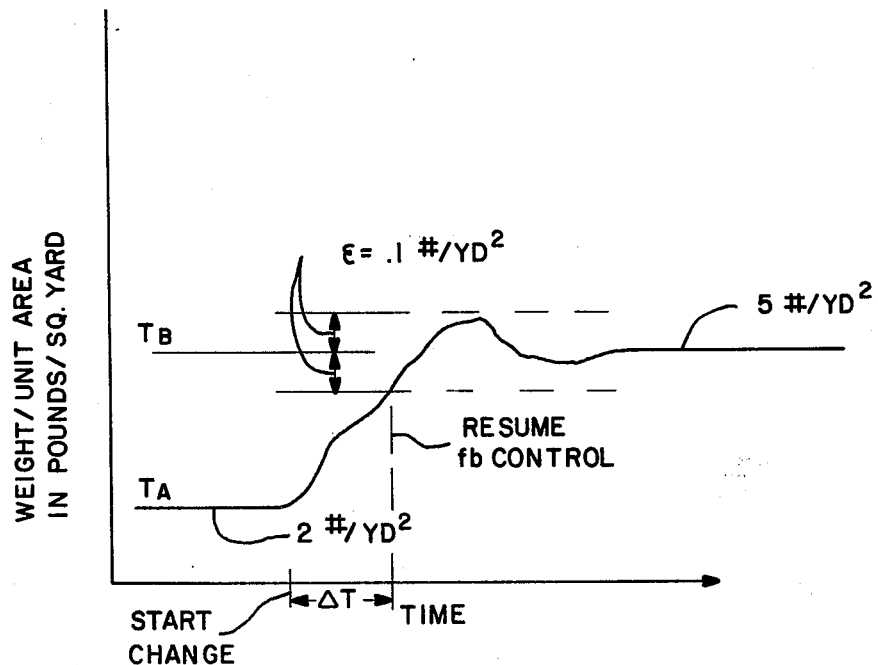
FIG.—2

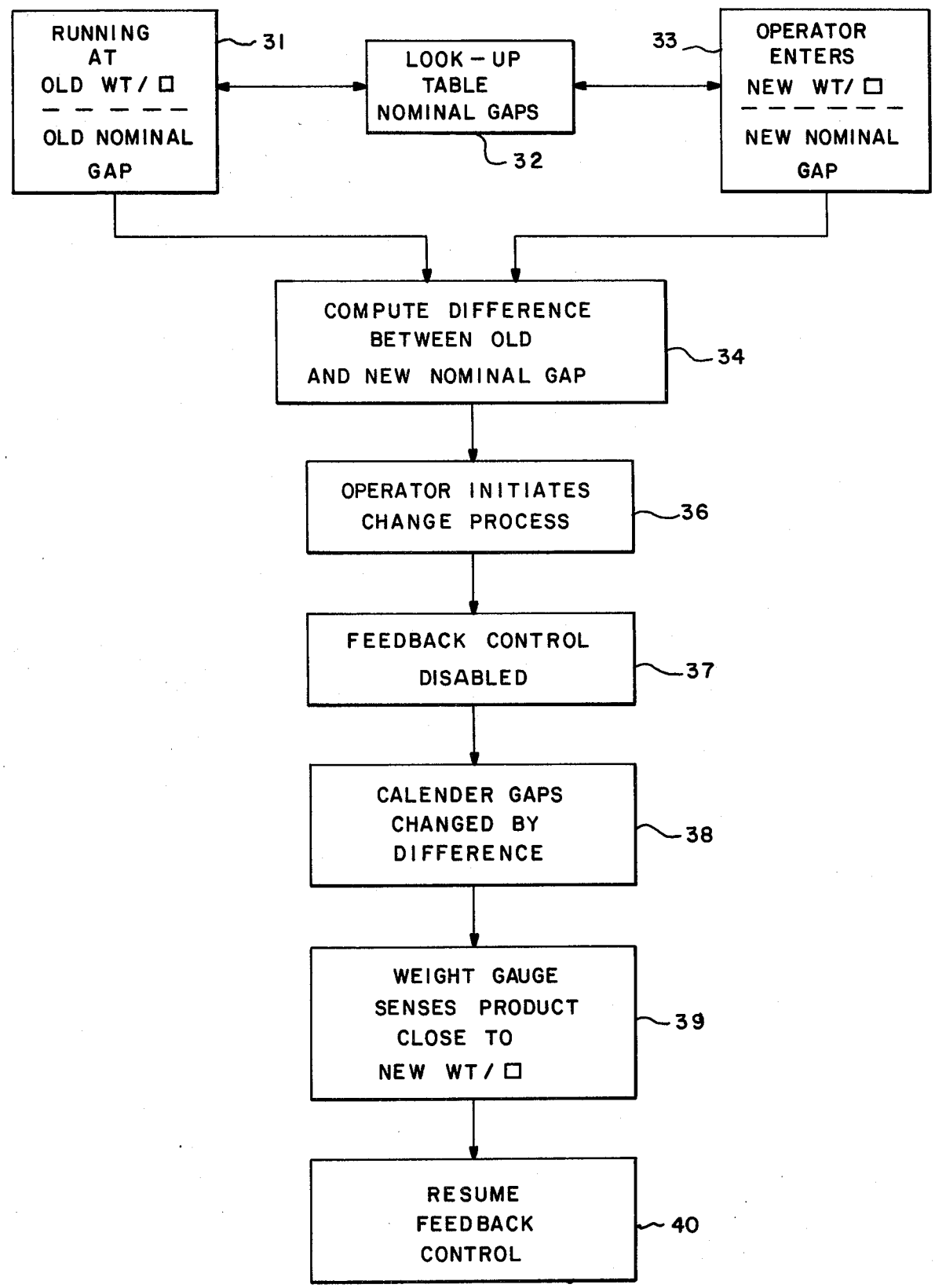
FIG.—3

METHOD FOR PRODUCING SHEET MATERIAL OF A DESIRED WEIGHT PER UNIT AREA

BACKGROUND OF THE INVENTION

The present invention relates to a method for producing sheet material of a desired weight per unit area and more particularly to a method for efficiently changing from one weight to another.

The sheet material to which the present invention is particularly directed is tire fabric. Such fabric may be made by calendering rubber onto a textile cord or onto a steel cord. Final basis weight or weight per unit area of the tire fabric is controlled by adjusting the gaps of the calender rolls. A feedback control system for accomplishing the foregoing is disclosed and claimed in U.S. Pat. No. 3,889,121 entitled "Apparatus For Measuring The Weight Per Unit Area of a Manufactured Sheet Product Consisting of a Reinforcing Material Surrounded by a Bulk Material", in the name of David A. Bossen and assigned to the present assignee.

Generally in the production of tire fabric each sheet of rubber which is calendered onto the steel or fabric cord of a particular type is given a particular code reference. The code reference is, of course, directly related to the final weight per unit area of the tire fabric. By long practice in the industry each code is related to a nominal gap in the calender rollers which will theoretically produce a tire fabric close to the desired weight per unit area. With a particular gap setting the final tire fabric produced will still vary depending on the temperature and speed of the calender rollers and the density and temperature of the rubber itself. In the past the nominal gap setting was chosen with these variables in mind and through empirical experience. However, only a very approximate nominal setting was possible and even then all variables could not be taken into consideration. For example, depending on the type of rubber being processed the separation force, which might be as much as 250,000 pounds, caused a bend of the calender rollers or a deflection of the entire frame of the calenders to cause errors in the basis weight of the final product.

Thus in one type of prior art operation which did not use computer control, after the new nominal gap setting was accomplished by, for example, actuating the screw-down motor, a check of the basis weight of the tire fabric was made by actually cutting out a sample of the produced fabric. The measurement of the sample took approximately 3½ minutes and the gap would be readjusted to produce a material of the proper weight per unit area. Because of the excessive time taken by this off-line test it is impractical where the entire running time of a particular "code" may be only seven mintues.

With computer control a more accurate measurement of the gap was sought by using a linear voltage displacement transducer (LVDT) on the rollers of the calender. For example, the feedback control technique of the Bossen patent could be used with a LVDT. However, the LVDT in measuring the gap at a position other than where the sheet is being formed again did not perform adequately.

There are two problems in computer feedback control. First, the nominal setting of the gap, when a new code is being run, initially will produce a sheet material which may have a basis weight vastly different than the desired basis weight. If the feedback control system is adjusted to bring the basis weight on target the feedback system will have an inherently slow and defective response; in other words, it will be incapable of accurate control with a low percentage of error from the desired target weight. On the other hand, a feedback control system tuned to work for only small differences from target will not adequately function when a large difference exists.

Another difficulty is the fact that there is an extremely complex and nonlinear relationship between the various parameters such as the bending of the calender rollers and the desired weight per unit area or code. For example, temperature variation changes the viscosity of the rubber material to thus change the separation force in the gap between the rollers thus changing the gap. In addition, the nominal gaps associated with each code have been notoriously unreliable varying in practice from 2 or 3 times from the stated nominal value.

OBJECTS AND SUMMARY OF THE INVENTION

It is, therefore, an object of the invention to provide an improved method for producing a sheet material of a desired weight per unit area and more particularly for changing from one desired weight to another.

Accordingly there is provided a method for producing a sheet material of a desired weight per unit area and for changing from said one desired weight per unit area to another. Such material is formed by a calender having rollers and includes means for adjusting the gap between rollers to vary the weight per unit area of such material. A gauge is included for sensing the actual weight per unit area of the material. A feedback control loop drives the gap adjusting means for causing the actual weight per unit area to move toward the desired weight per unit area. Computer means include memory means for storing nominal gap distances respectively for a plurality of different desired weights per unit area of the sheet material. The method comprises the following steps. The sheet material is run at one desired weight per unit area and the feedback control loop is allowed to adjust the gap to move the actual weight per unit area toward the desired weight per unit area. The nominal gap is determined at the one desired weight per unit area and another desired weight per unit area is entered in the computer means. The difference is found between the nominal gaps stored in the memory means, associated with another desired weight per unit area and the previous nominal gap. The feedback control loop is disabled. Thereafter, the gap adjusting means is actuated a distance corresponding to the difference. The actual weight per unit area of the material is sensed and compared to another desired weight per unit area and the feedback control is resumed if the difference therebetween is less than a predetermined amount.

BRIEF DESCRIPTION OF THE DRAWINGS

FIG. 1 is a schematic illustration of a calendering process embodying the present invention;

FIG. 2 is a graph useful in understanding the method of the present invention; and FIG. 3 is a flow or processing chart embodying the present invention.

DETAILED DESCRIPTION OF THE PREFERRED EMBODIMENT

FIG. 1 generally shows a tire fabric calender in schematic form with the basic arrangement being well-known in the art. In operation, a steel or fabric cord 10 is passed through a calender consisting of the rollers 12, 14 and 16, 18. Rollers 12 and 14 act together to convert rubber, sometimes called gum, from bulk form to a thin sheet having carefully controlled thickness. Rollers 16 and 18 act in a like manner. Rollers 14 and 16 work together to apply a sheet of rubber to both sides of cord 10 to form the tire fabric 20.

The tire fabric emerging from the calender is passed between an upper gauging head 22 and a lower gauging head 24 of the weight per unit area or basis weight gauge 21. From there fabric 20 is wound on reels (not shown) to be cut and formed into tires at a later time.

Measurements from the gauge are supplied on line 25 to a computer 26 where the raw measurements from the gauge are converted to a basis weight or weight per unit area for the product. This is compared to a desired target weight and an error correction is applied to the hydraulic screw-down equipment at 27 and 28 associated respectively with roller pairs 12, 14 and 16, 18. These specifically are screw-down units 27a–c and 28a–c which divide the rollers longitudinally into three zones. The thickness in each zone is controlled in a well-known manner. In practice the scanning gauge 21 scans each of the three zones to provide the necessary feedback action. All of the foregoing is discussed in the above Bossen patent.

However as will be discussed in detail below when a new code or weight per unit area of a material is to be produced the operator by means of input unit 29 may enter the new code and also initiate its production by pressing a start push button.

FIG. 2 illustrates a change from one code, designated $T_A$, the old weight per unit area, to a new code, $T_B$ the new weight per unit area with representative values pounds per square yard. Ideally, it is desired that the change be as rapid as possible to conserve material and that the new code reach a stabilized value within specification. In accordance with the invention, when the change from one code to another is initiated by the operator the feedback control system is disabled and such control is not resumed until the new basis weight is close to the desired target by an amount designated $\epsilon$.

Referring now to FIG. 3 the method operates as follows. In block 31 the process is indicated as running at the old weight per unit area, $T_A$. Feedback control is, of course, maintaining the product at this weight. The calenders have, of course, an actual gap which may be determined from the gap initially set which might have been, for example, the nominal gap and then the adjustment of the gap by the feedback control loop which adjusts the screw-down. The original nominal gap can be obtained from the lookup table 32 which is a portion of the computer 26. When a change to a new code is desired the operator as illustrated in block 33 enters the new code which is in essence a new weight per unit area. This is actually done in the input unit 29 illustrated in FIG. 1. From the lookup table the nominal gap for this new weight is retrieved and in block 34 the new nominal gap is compared to the old nominal gap and the difference computed.

Then by means of unit 29 and as shown in block 36 the operator initiates the change process the feedback control is disabled as illustrated in block 37. Next as shown in block 38 the difference between the old and new nominal gaps is utilized to change the calender gaps. In actual practice, the screw-down adjustments are varied by the amount corresponding to this difference. Referring to FIG. 2 this causes the weight per unit area curve to start moving up toward the new $T_B$ line and when the weight is close enough to the target weight feedback control is resumed. Such weight per unit area is sensed by the weight gauge as indicated in block 39 which resumes feedback control with the new basis weight target as in block 41.

As discussed above, for an effective feedback control loop there cannot be a large difference between the target value and the actual value and thus, feedback control is not resumed until the difference is less than a predetermined amount. For example, the $\epsilon$ amount in the example in FIG. 2 is 0.1 pounds per square yard (0.054 Kg/m$^2$) where the final basis weight is 5 pounds per square yard (0.27 Kg/m$^2$). As an example of the foregoing, presume with the weight of $T_A$ that this would have a nominal gap of 10 mils and $T_B$ a nominal gap of 20 mils. The actual operating gap could as discussed above be 2 to 3 times the nominal gap but assume that the actual gap due to feedback control adjustments is now 18 mils. The difference between the old nominal gap and new nominal gap is 10 and this is added to the actual gap of 18 to produce the new setting of 28. Compare the 28 to the nominal gap value of 20.

In summary by the foregoing technique parameters of the process which cannot be predicted are automatically biased out for all running conditions. In fact what is compensated for is the complex relation between the forming gap and the weight per unit area which neither is predictable nor linear. In addition, hardware, such as LVDTs, is not needed.

What is claimed is:

1. In a method for producing a sheet material of a desired weight per unit area and for changing from said one desired weight per unit area to another where such material is formed by a calender having rollers and including means for adjusting the gap between rollers to vary the weight per unit area of such material, and including a gauge for sensing the actual weight per unit area of said material and including a feedback control loop driving said gap adjusting means for causing said actual weight per unit area to move toward said desired weight per unit area, and computer means including memory means for storing nominal gap distances respectively for a plurality of different desired weights per unit area of said sheet material, said method comprising the following steps: running at said one desired weight per unit area and allowing said feedback control loop to adjust said gap to move said actual weight per unit area toward said one desired weight per unit area; determining the nominal gap at said one desired weight per unit area, entering said another desired weight per unit area in said computer means; finding the difference between the nominal gap, stored in said memory means, associated with said another desired weight per unit area and said one nominal gap; disabling said feedback control loop; thereafter actuating said gap adjusting means a distance corresponding to said difference; sensing the actual weight per unit area of said material and comparing it to said another desired weight per unit area and resuming said feedback control if the difference therebetween is less than a predetermined amount.

* * * * *